(12) United States Patent
Hayashi et al.

(10) Patent No.: US 8,899,367 B2
(45) Date of Patent: Dec. 2, 2014

(54) SADDLE-RIDE TYPE VEHICLE

(75) Inventors: Takazumi Hayashi, Wako (JP); Michio Atsuchi, Wako (JP); Masahiro Kawamata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 13/363,836

(22) Filed: Feb. 1, 2012

(65) Prior Publication Data

US 2012/0199408 A1 Aug. 9, 2012

(30) Foreign Application Priority Data

Feb. 9, 2011 (JP) .................................. 2011-026306

(51) Int. Cl.
| | | |
|---|---|---|
| *B62K 11/00* | (2006.01) | |
| *F02M 33/02* | (2006.01) | |
| *B62J 35/00* | (2006.01) | |

(52) U.S. Cl.
CPC ............. *B62J 35/00* (2013.01); *B62K 2202/00* (2013.01)
USPC .......................................... 180/219; 123/519

(58) Field of Classification Search
USPC ............ 180/219, 227, 230; 280/835; 123/519
See application file for complete search history.

(56) References Cited

U.S. PATENT DOCUMENTS

| | | | | |
|---|---|---|---|---|
| 8,276,702 B2* | 10/2012 | Inaoka | ......................... | 180/219 |
| 8,276,944 B2* | 10/2012 | Inaoka | ......................... | 280/835 |
| 8,327,964 B2* | 12/2012 | Inaoka et al. | ................. | 180/219 |
| 8,448,737 B2* | 5/2013 | Hasegawa | ..................... | 180/219 |
| 8,490,733 B2* | 7/2013 | Kitta | ............................. | 180/219 |
| 8,584,784 B2* | 11/2013 | Nagura et al. | ................ | 180/228 |
| 2004/0108160 A1* | 6/2004 | Sato et al. | ..................... | 180/312 |
| 2010/0065362 A1* | 3/2010 | Shimura et al. | ............... | 180/219 |
| 2010/0078241 A1* | 4/2010 | Maeda et al. | ................. | 180/68.3 |
| 2010/0206653 A1* | 8/2010 | Koike | .......................... | 180/225 |
| 2010/0242925 A1* | 9/2010 | Yoshida et al. | ............... | 123/519 |
| 2010/0243358 A1* | 9/2010 | Suzuki | .......................... | 180/219 |
| 2012/0240905 A1* | 9/2012 | Kondo et al. | ................. | 123/519 |

FOREIGN PATENT DOCUMENTS

JP 04-372484 12/1992

* cited by examiner

*Primary Examiner* — Joseph M Rocca
*Assistant Examiner* — Marc A Scharich
(74) *Attorney, Agent, or Firm* — Squire Patton Boggs (US) LLP

(57) ABSTRACT

A saddle-ride type vehicle can include a pair of left and right seat rails, a fuel tank attached to the seat rails, a rear fender arranged below the fuel tank, and a canister arranged above the rear fender and adsorbing fuel gas which evaporates in the fuel tank. The canister is arranged under a rear portion of the fuel tank, at least partially superposed on the fuel tank as viewed from a plan view of the vehicle, and arranged in a vehicle forward direction with respect to a cross member which interconnects rear portions of the pair of left and right seat rails.

20 Claims, 11 Drawing Sheets

SADDLE-RIDE TYPE VEHICLE

BACKGROUND

1. Field

The present invention relates to an improvement of a saddle-ride type vehicle which is provided with a canister adsorbing fuel gas which evaporates in a fuel tank.

2. Description of the Related Art

Saddle-ride type vehicles are known, in which a canister is provided at a vehicle, and fuel gas that is produced in a fuel tank is absorbed by the canister, thus preventing the fuel gas from being emitted into the atmosphere.

Such a configuration is shown, for example, in Patent Literature 1 (JP-A-No. 4-372484). As shown in FIGS. 2 and 3 of the Patent Literature 1, a fender (4) which acts as a mudguard covering a rear wheel (3) (the numeral in the parentheses is a reference sign described in the Patent Literature 1. The same shall apply thereafter.) is provided at a rear portion of the saddle-ride type vehicle, a canister (18) is provided on a right side of the fender (4) in a vehicle width direction, and a fuel tank (1) is arranged above the canister (18). That is, the canister (18) is arranged between the fuel tank (1) and the fender (4) in a height direction and provided on a right side in the vehicle width direction, as viewed from a top plane view of the vehicle.

In Patent Literature 1, the canister (18) is arranged at a position above the fender (4) and on the right side in the vehicle width direction, so that in order to protect the canister (18) from the outside, it is necessary to take a step to separately provide a protection wall at the fender (4).

In addition, if the fuel tank (1) is structured so as to have an enough volume, while allowing the canister (18) to be arranged at a vehicle rear portion, there is a problem that the vehicle is required to have increased height.

Technology would be helpful which can protect the canister and, at the same time, allow the fuel tank to have the enough volume, without requiring an increase in vehicle size.

SUMMARY

An object of the present invention is to provide a saddle-ride type vehicle which can protect a canister and, at the same time, allow a fuel tank to have an enough volume, without involving an increase in the size of the vehicle.

In one embodiment, a saddle-ride type vehicle includes a vehicle body frame, and a pair of left and right seat rails included in the vehicle body frame and extending in a vehicle rearward direction. A fuel tank can be mounted to the seat rails, and a seat can be arranged above the fuel tank. A fender can be arranged below the fuel tank and covering at least an upper portion of a rear wheel, and a canister can be arranged above the fender. The canister is arranged under a rear portion of the fuel tank, so as to be at least partially superposed on the fuel tank as viewed from a plan view of the vehicle and so as to be superposed on the seat rails as viewed from a side view of the vehicle. The canister is arranged in a vehicle forward direction with respect to a cross member which interconnects rear portions of the pair of left and right seat rails.

In another embodiment, end portions of the fender in a vehicle width direction are connected to a vehicle body cover arranged, via a connecting member, outward of the canister in the vehicle width direction. The canister is provided with a body portion extending in the vehicle width direction, a first side surface portion forming one side surface in a left and right direction which closes an opening of the body portion, and a second side surface portion forming the other side surface in the left and right direction. A fuel gas inlet port allows fuel gas evaporating in the fuel tank to flow into the canister, and a fuel gas outlet port allows the fuel gas accumulated in the canister to be discharged outside are provided at the first side surface portion. An atmosphere-opening port causes pressure in the canister to be regulated to an atmospheric pressure, and a drain port allows liquid accumulated in the canister to be discharged. The ports are provided at the second side surface portion. Intake piping is extended from the fuel tank and allows the fuel gas evaporating in the fuel tank to flow, and is connected to the fuel gas inlet port, and the atmosphere-opening port is opened so as to face the vehicle body cover.

In another embodiment, the intake piping is extended in the vehicle width direction and bend-formed so as to be folded back in the left and right direction.

In another embodiment, a rib which supports the canister is formed integrally with the fender and a piping holding portion which bears the piping is formed at the rib.

In another embodiment, fuel tank mounting portions are provided at the pair of left and right seat rails, to which the fuel tank is mounted, and are arranged outside the first side surface portion and second side surface portion in the vehicle width direction when viewed from the plan view of the vehicle.

In another embodiment, grab rail mounting portions mount a grab rail to the pair of left and right seat rails. An occupant can grasp the grab rails, which are provided at a position of the fuel tank mounting portions in the vehicle rearward direction.

In another embodiment, a seat catcher mechanism which holds the seat is provided at the cross member.

In another embodiment, discharge piping which discharges the fuel gas accumulated in the canister is extended from the fuel gas outlet port. The discharge piping is connected to an air intake device of the engine, and is composed of first discharge piping extending from the fuel gas outlet port, a joint member connected to a tip of the first discharge piping, and second discharge piping extending from the joint member and connected to the air intake system of the engine. A piping holder portion which holds the discharge piping at a region of the joint member is formed integrally with the rear fender.

In another embodiment, a resin luggage box is provided in a vehicle forward direction relative to the fuel tank and under the seat, the air intake system is provided in front of the luggage box, and a hose hook which locks the discharge piping is provided at the luggage box.

In certain embodiments, therefore, the canister is arranged under the rear portion of the fuel tank, in the vehicle forward direction with respect to the cross member, and between the pair of left and right seat rails. That is, the fuel tank and the cross member are arranged in front of the canister and in rear of the canister, respectively, and the seat rails are arranged laterally in the left and right direction.

Since the left, right and rear sides of the canister are surrounded by the seat rails and the cross member, it is possible to protect the canister, without involving an increase in the number of components.

Moreover, since the canister is formed so as to be at least partially superposed on the fuel tank as viewed from the plan view of the vehicle, a space in rear of the fuel tank can be effectively used while easily securing a predetermined fuel tank volume.

In another embodiment of the invention, the canister is extended in the vehicle width direction, so that an increase in the size of a longitudinal direction of the vehicle can be suppressed and a length of the fuel tank in the vehicle width direction can be easily secured. Consequently, a fuel volume is easy to be secured.

Moreover, the atmosphere-opening port which is opened in the canister is covered with the vehicle body cover and the fender which are connected to each other by the connecting members, so that a clearance between the vehicle body cover and the fender is reduced and dust resistance in the vicinity of the atmosphere-opening port can be enhanced. If the dust resistance of in the vicinity of the atmosphere-opening port is enhanced, any piping which is usually connected to the atmosphere-opening port in order to secure the dust resistance can be omitted. If the piping can be omitted, a space which might be needed for layout and installing of the piping is reduced. Therefore, an efficient and compact configuration for the vehicle is possible.

In other embodiments, the intake piping which is extended in the vehicle width direction can be bend-formed so as to be folded back in the left and right direction.

When the vehicle is inclined to the left or right, the fuel in the fuel tank may intrude into the intake piping. According to embodiments of the present invention, intrusion of the fuel can be suppressed by the bent portions in the intake piping. When the vehicle is returned from the inclined state, the fuel is returned to the fuel tank. Therefore, without using a rollover valve or the like, it is possible to suppress flowing of the fuel into the canister when the vehicle is inclined.

In another embodiment, the rib is formed integrally with the fender and, moreover, the piping-bearing portion is formed at the fender. The rib can be reinforced by the piping-bearing portion.

Moreover, the case where the piping-bearing portion is formed integrally with the rib enhances rigidity of them and can realize weight reduction of the piping-bearing portion and the rear rib, as compared to a case where the piping-bearing portion and the rib are formed separately from each other.

In other embodiments, the fuel tank mounting portions are disposed outside the first and second side surface portions of the canister in the vehicle width direction. The fuel tank mounting portions are rich in rigidity and both the ends of the canister are covered with such fuel tank mounting portions, so that it is possible to effectively protect the canister from a vehicle outward direction.

In certain embodiments, the canister is covered with the grab rail as well as the pair of left and right seat rails to which the tank mounting portions are attached. The grab rail is rich in rigidity and both the ends of the canister are covered with such a grab rail, so that it is possible to effectively protect the canister from the vehicle outward direction.

In certain embodiments, the seat catcher mechanism is extended in the height direction relative to the cross member. It is possible to cover the canister from the vehicle rearward direction, by the seat catcher mechanism which is extended in the height direction, so that a protection range for the canister can be increased and dust resistance can be enhanced.

In certain embodiments, the discharge piping is made as a division structure composed of the first discharge piping and the second discharge piping. If the discharge piping is long, layout efficiency is deteriorated, and cost for manufacturing and installation can be high.

With respect to this, according to embodiments of the present invention, the discharge piping is divided and an object to be processed is shortened, so that working cost required for manufacturing can be reduced.

Moreover, the first discharge piping and the second discharge piping are connected by the joint member. The joint member becomes larger in diameter than general portions of the first and second discharge pipings. When the joint member and the ends of the first and second discharge pipings are attached to the piping holder portion, the discharge piping can be easily positioned with respect to the longitudinal direction of the piping.

In some embodiments, the discharge piping which is extended to the air intake system from the canister can be held by the resin luggage box which is relatively large-sized. Since the luggage box is made of resin, formation of the holding portion is easily performed. The holding portion can be formed at an optional position by using the relatively large-sized luggage box. Therefore, the routing of the discharge piping can be made linear and a piping length can be reduced.

DETAILED DESCRIPTION

Figure 1:
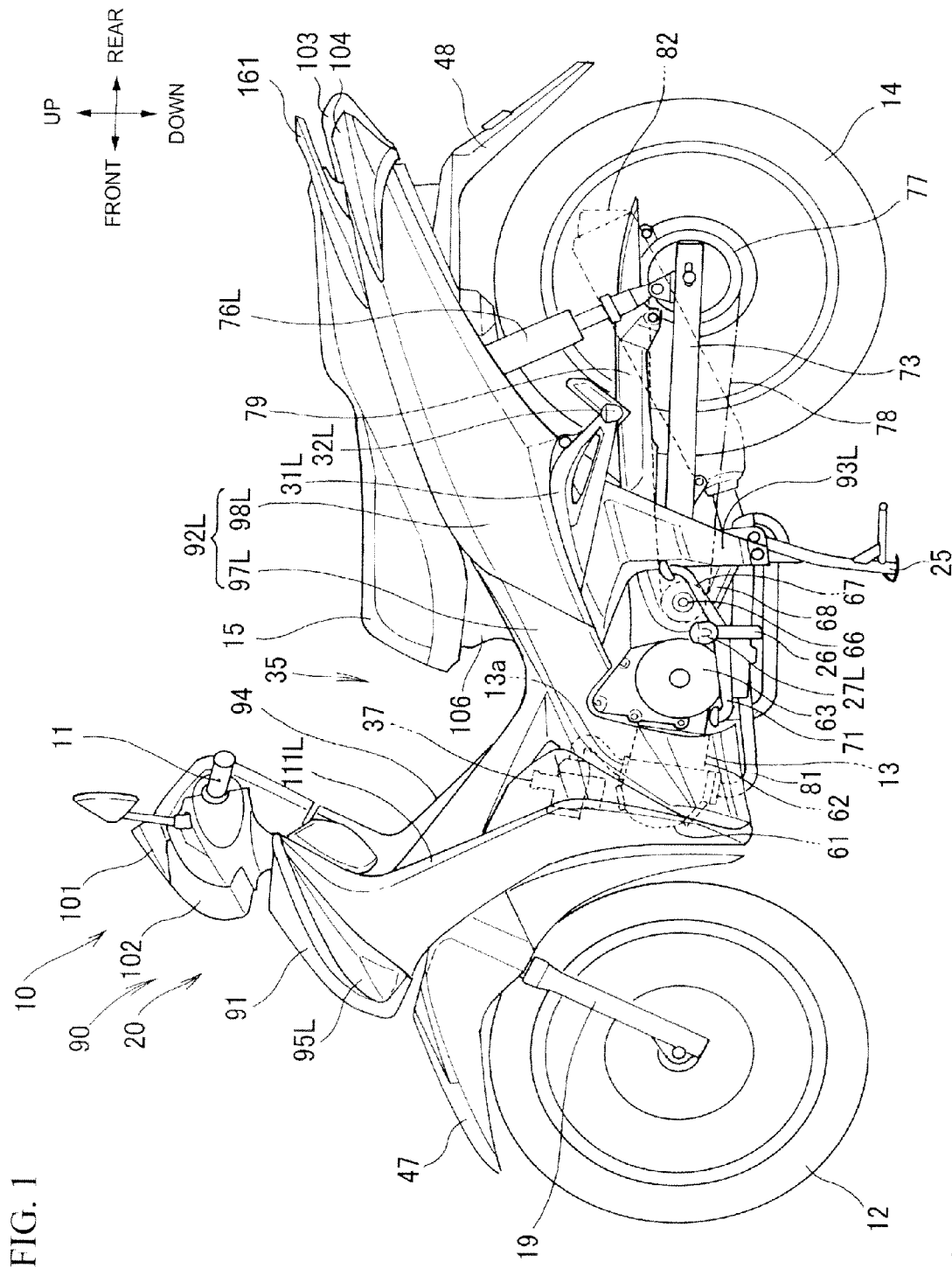
FIG. 1 is a left side view of a motorcycle according to the present invention.

Embodiments of the present invention will be explained in detail hereinafter. In the drawings and embodiment, "up", "down", "front", "rear", "left", and "right" respectively indicate directions as viewed from the position of a rider riding on a motorcycle. Incidentally, the drawings are to be viewed according to the orientation of reference signs.

As shown in FIG. 1, the motorcycle 10 includes a front wheel 12 arranged at a vehicle front portion and adapted to be steerable by a handlebar 11, an engine 13 acting as a drive source arranged behind the front wheel 12, a rear wheel 14 arranged behind the engine 13 and driven by the engine 13, and a seat 15 provided between the front wheel 12 and the rear wheel 14. The motorcycle is a saddle-ride type vehicle on which an occupant rides by straddling the seat 15.

Figure 2:
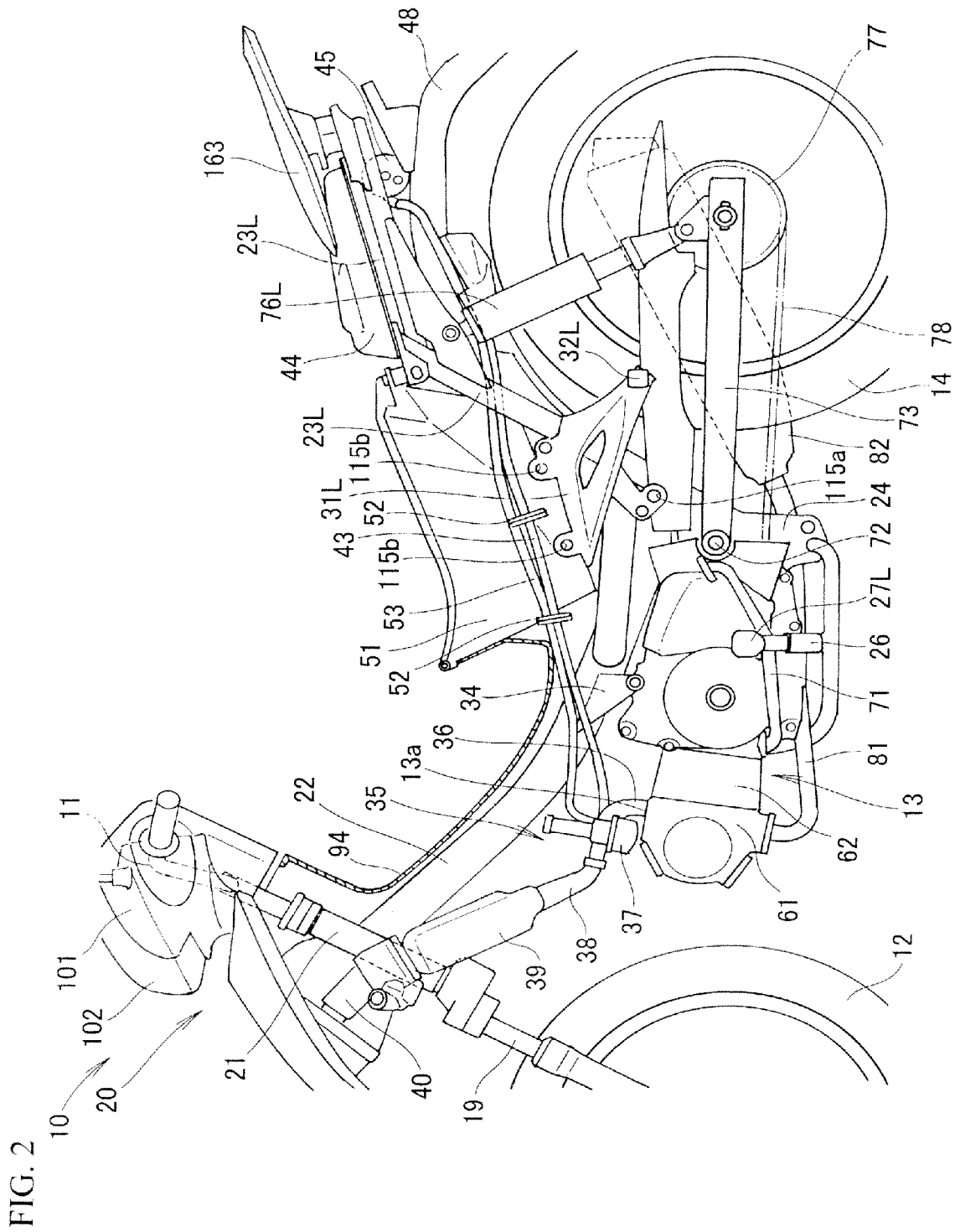
FIG. 2 is a view for explaining routing of a discharge piping extending to an air intake system from a canister.

As shown in FIG. 2, the vehicle body frame 20 is composed of, as main elements, a headpipe 21 steerably supporting a front fork 19 which supports the front wheel 12, one main frame 22 extending in an oblique rearward direction of the vehicle from the headpipe 21, a pair of left and right seat rails 23L, 23R (only reference sign 23L on this side is shown) extending in a vehicle rearward direction from a rear portion of the main frame 22, and a pair of left and right pivot frames 24 hanging down from the rear portion of the main frame 22. A main stand (in FIG. 1, reference sign 25) is provided at the pivot frames 24.

A step stay 26 is mounted to an undersurface of the engine 13. The step stay 26 extends outwardly in a vehicle width direction. Left and right steps 27L, 27R for the rider (only reference sign 27L on this side is shown), on which the rider can place his/her feet are provided at both ends of the step stay 26.

Moreover, left and right pillion step brackets 31L, 31R (only reference sign 31L on this side is shown) are mounted to the left and right seat rails 23L, 23R at outward positions of the seat rails 23L, 23R in the vehicle width direction. The left and right pillion step brackets 31L, 31R are respectively members which support steps 32L, 32R (only reference sign 32L on this side is shown) on which a pillion passenger can place his/her feet. Longitudinal portions of the left and right pillion step brackets 31L, 31R are extended in a vehicle longitudinal direction.

The engine 13 is disposed under the main frame 22. An air intake system 35 is provided above the engine 13. The engine 13 is suspended by an engine stay 34.

The air intake system 35 can be composed of an intake pipe 36 connected to an air intake port which is formed in an upper surface of a cylinder head 61 making up a part of the engine 13, a carburetor 37 connected to a tip of the intake pipe 36, a connecting tube 38 connected to a tip of the carburetor 37, an air intake chamber 39 connected to a tip of the connecting tube 38, and an air cleaner 40 connected to a tip of the air intake chamber 39. The carburetor 37 may be a throttle body.

Fuel piping 43 which supplies fuel is extended from a fuel tank 44, which is arranged at the vehicle rear portion, and connected to the air intake system 35. Moreover, a canister 45 which accumulates fuel gas evaporating in the fuel tank 44 is arranged under a rear portion of the fuel tank 44. Discharge piping 53 through which the fuel gas accumulated in the canister 45 passes is extended forward from the canister 45. The discharge piping 53 is connected to the carburetor 37 or the intake pipe which constitutes a part of the air intake system 35.

The fuel tank 44 is attached to the pair of left and right seat rails 23L, 23R.

A fender such as rear fender 48 which covers at least an upper portion of the rear wheel 14 is arranged below the fuel tank 44. The canister 45 is arranged above the rear fender 48.

A resin luggage box 51 is disposed in a vehicle forward direction with respect to the fuel tank 44. The air intake system 35 is provided in front of the luggage box 51. Hose hooks 52 which lock a fuel hose supplying the fuel to the carburetor 37 from the discharge piping 53 and the fuel tank 44 are provided at the luggage box 51.

Referring to FIG. 2 together with FIG. 1, the seat 15 is provided above the fuel tank 44 and the luggage box 51. Namely, the luggage box 51 is provided under the seat 15.

Incidentally, while the two hose hooks 52 are provided at front and rear portions of the luggage box 51 in this embodiment, the number of the hose hooks may be increased or reduced as needed.

Referring again to FIG. 2, a swing arm 73 which rotatably supports the rear wheel 14 is swingably journaled, via a pivot shaft 72, to an outside of rear portions of the pivot frames 24, hanging down from a rear portion of the main frame 22, in the vehicle width direction. Rear cushion units 76L, 76R are respectively interposed between the swing arm 73 and the seat rails 23L, 23R.

Referring to FIG. 1, the engine 13 is provided with the cylinder head 61, a cylinder block 62, and a crankcase 63 formed integrally with a transmission case, in the vehicle rearward direction from the vehicle forward direction. At the crankcase 63 of the engine rear portion, a drive shaft 66 acting as an output shaft of the engine 13 and a drive sprocket 67 attached to the drive shaft 66 are provided. A drive sprocket cover 68 which covers such a drive sprocket 67 is attached to the engine 13. A gear shift pedal 71 is attached to the crankcase 63.

The drive sprocket 67 is attached to the drive shaft 66. A driven sprocket 77 is attached to the rear wheel 14. A chain 78 which transmits drive force to the rear wheel 14 from the drive shaft 66 is stretchedly wound around between the drive sprocket 67 and the driven sprocket 77. At least an upper portion of the chain 78 and a side surface of the upper portion of the chain are covered with a chain case 79. The chain case 79 is attached at front and rear portions thereof to the swing arm 73.

An exhaust pipe 81 is connected to an undersurface of the cylinder head 61. The exhaust pipe 81 is extended in the vehicle rearward direction and connected at a rear end thereof to a muffler 82.

The motorcycle 10 is covered with the vehicle body cover 90. The vehicle body cover 90 has a front cover 91 covering a front surface of the vehicle, side covers 92L, 92R (only reference sign 92L on this side is shown) provided so as to continue in the vehicle rearward direction from a rear portion of the front cover 91, the side covers being extended in the vehicle rearward direction and covering side surfaces of the vehicle, left and right pivot plate covers 93L, 93R (only reference sign 93L on this side is shown) continuously arranged at lower edges of the left and right side cover 92L, 92R and covering the pivot frames (in FIG. 2, reference sign 24) from the outside in a lateral direction, and an upper cover 94 provided at upper portions of the side covers 92L, 92R and covering an upper portion of the vehicle. Left and right turn signals or winkers 95L, 95R (only reference sign 95L on this side is shown) are attached to the front cover 91.

The side cover 92L, 92R is composed of left and right main frame side covers 97L, 97R (only reference sign 97L on this side is shown) covering the main frame (in FIG. 2, reference sign 22) and left and right sides of the engine 13, and left and right rear side covers 98L, 98R (only reference sign 98L on this side is shown) continuously extended in the vehicle rearward direction from rear edges of the left and right main frame side covers 97L, 97R.

A front fender 47 is arranged above the front wheel 12. A handlebar cover 101 which surrounds the handlebar 11 is arranged around the handlebar 11. A headlight 102 is attached to a front portion of the handlebar cover 101. Moreover, the rear fender 48 is arranged above the rear wheel 14. A taillight 103 is arranged above the rear fender 48. A taillight cover 104 which covers the taillight 103 is provided. A grab rail 161 is arranged above the taillight cover 104. A center cover 106 is arranged under the seat 15.

At least left and right sides of the headpipe 21, engine 13, air intake system 35 and main frame (in FIG. 2, reference sign 22) are covered with the left and right main frame side covers 97L, 97R which are formed separately from each other. The upper cover 94 which covers the upper portion of the main frame 22 is arranged between the left and right main frame side covers 97L, 97R.

In addition, left and right leg shields 111L, 111R (only reference sign 111L on the left side is shown) which act as windbreakers are arranged at a front portion of the main frame 22. The left and right leg shields 111L, 111R are extended in the height direction. In this embodiment, the left and right leg shields 111L, 111R are respectively included in the left and right main frame side covers 97L, 97R and formed integrally with the left and right main frame side covers 97L, 97R.

The left and right pillion step brackets 31L, 31R which support the steps 32L, 32R on which the pillion passenger places his/her feet are attached to the outsides of the left and right seat rails 23L, 23R in the vehicle width direction. The left and right pivot plate covers 93L, 93R are adapted to be attached to fitting portions (in FIG. 2, reference signs 115a, 115a (only reference sign 115a on this side of the drawing is shown)) which are attachedly provided at edges of the left and right pillion step brackets 31L, 31R.

Concretely, the left and right pivot plate covers 93L, 93R are respectively attached to the fitting portions (in FIG. 2, reference signs 115a, 115a) which are provided at lower portions of the left and right pillion step brackets 31L, 31R, and the left and right rear side covers 98L, 98R are attached to fitting portions (in FIG. 2, reference signs 115b, 115b (only reference sign 115b on this side of the drawing is shown)) which are provided at upper portions of the left and right pillion step brackets 31L, 31R.

The left and right pivot plate covers 93L, 93R are arranged so as to be superposed on both of the drive sprocket cover 68 and the chain case 79, as viewed from a side view of the vehicle.

Incidentally, the canister (in FIG. 2, reference sign 45) is covered with the vehicle body cover (rear side covers 98L, 98R) from the outside in the vehicle width direction. That is, the vehicle body cover (rear side covers 98L, 98R, and under covers 99L, 99R) is arranged outside in the vehicle width direction.

Figure 3:
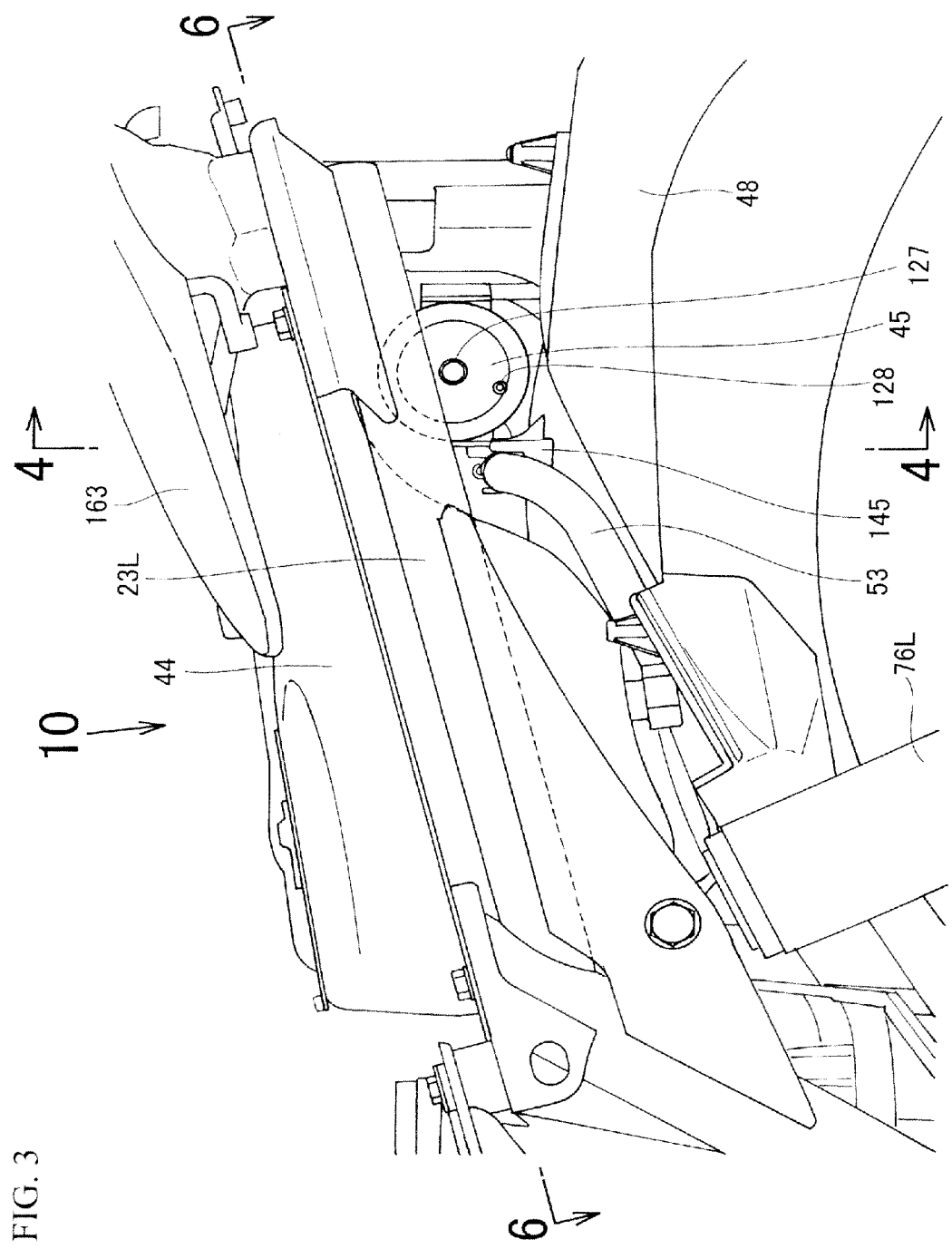
FIG. 3 is a side view of a rear portion of a vehicle with a rear cover and a seat being removed therefrom.

As shown in FIG. 3, the canister 45 can be arranged under the rear portion of the fuel tank 44 and arranged inside the seat rails 23L, 23R in the vehicle width direction so as to be superposed on the seat rails 23L, 23R as viewed from the side view of the vehicle.

Figure 4:
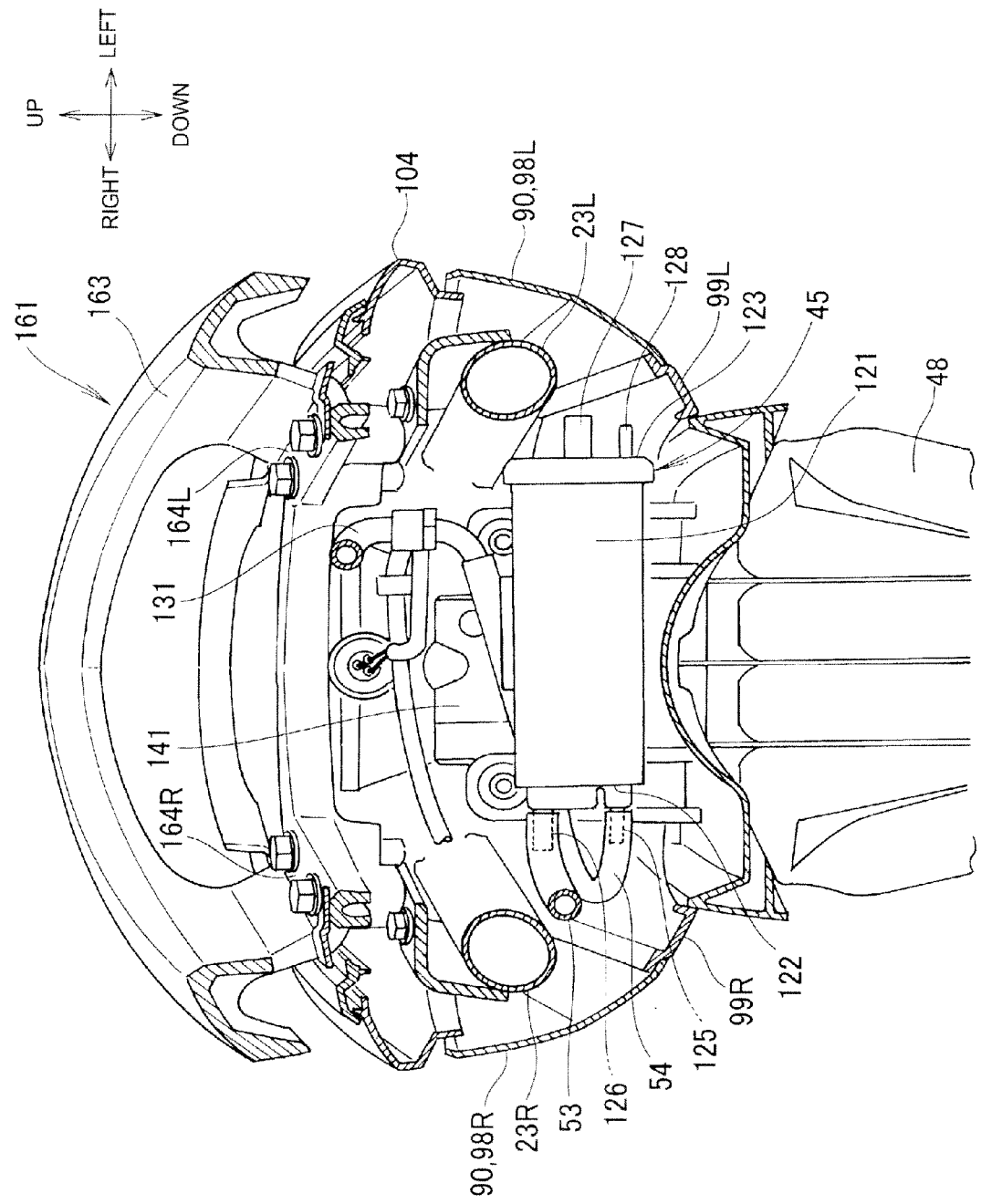
FIG. 4 is a cross-sectional view taken along a line 4-4 in FIG. 3.

As shown in FIG. 4, the canister 45 is provided with a body portion 121 extending in the vehicle width direction, a first side surface portion 122 forming one side surface, in a left and right direction, which closes an opening of the body portion 121, and a second side surface portion 123 forming the other side surface in the left and right direction. At the first side surface portion 122, a fuel gas inlet port 125 which allows the fuel gas evaporating in the fuel tank (in FIG. 3, reference sign 44) to flow into the canister 45, and a fuel gas outlet port 126 which allows the fuel gas accumulated in the canister 45 to be discharged outside are provided. At the second side surface portion 123, an atmosphere-opening port 127 which allows excessive fuel gas in the canister 45 to be released into the atmosphere, and a drain port 128 which allows liquid accumulated in the canister 45 to be discharged are provided. Intake piping 54 which is extended from the fuel tank 44 and allows the fuel gas evaporating in the fuel tank 44 to flow is connected to the fuel gas inlet port 125. The atmosphere-opening port 127 is covered with the vehicle body cover 90 and the fender 48.

Figure 5:
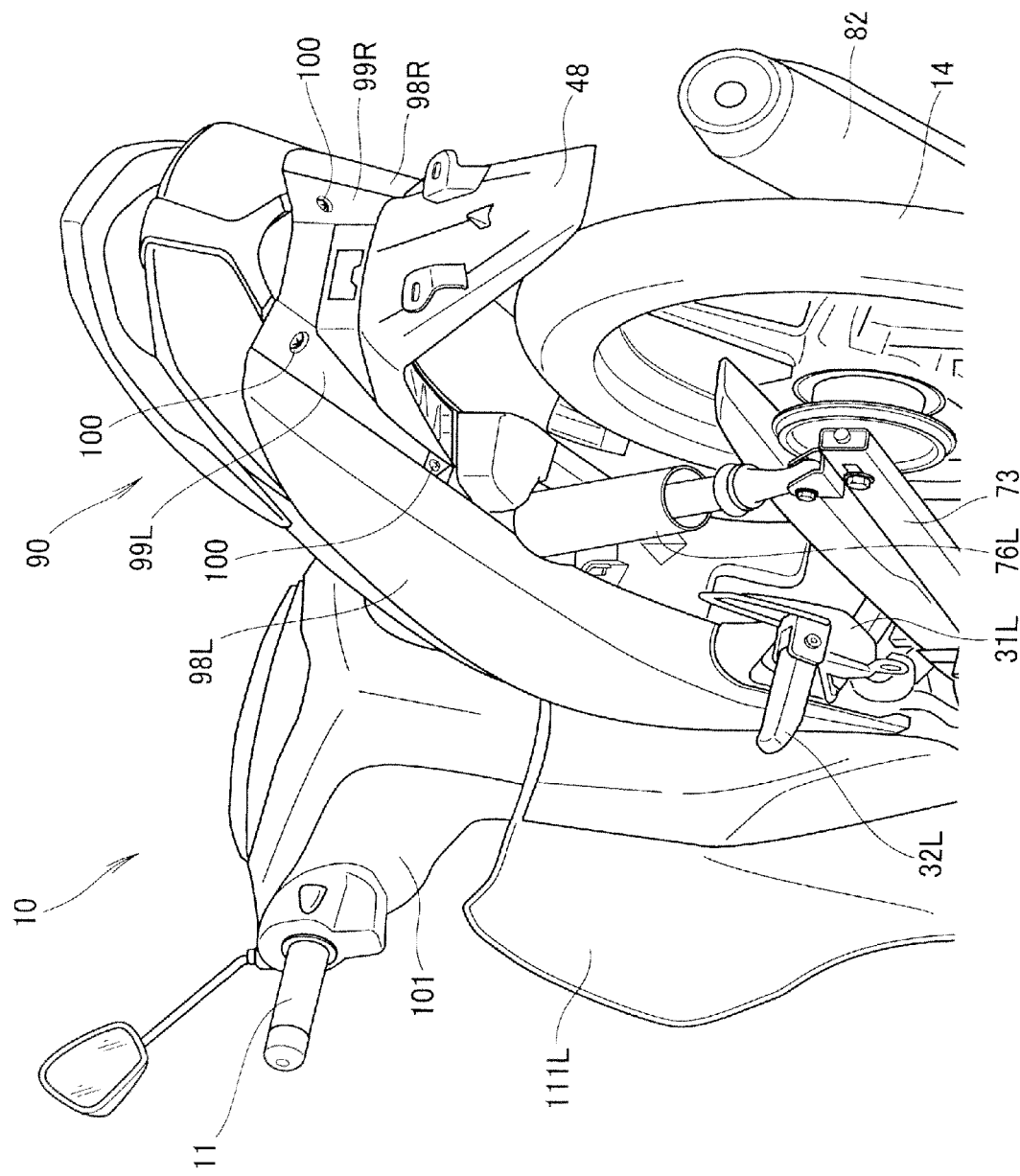
FIG. 5 is a perspective view of an end portion of a rear fender in a vehicle width direction and of the neighborhood thereof.

As shown in FIG. 5, ends of the rear fender 48 in the vehicle width direction are respectively connected, by connecting members 100, to the under covers 99L, 99R which constitute a part of the vehicle body cover 90 arranged outside the canister (45) in the vehicle width direction.

Referring to FIGS. 4 and 5, the rear fender 48, the under covers 99L, 99R, and the rear side covers 98L, 98R are connected to one another in such a manner that a clearance among them is minimized. The atmosphere-opening port 127 is arranged near the under cover 99L and inside the under cover 99L in the vehicle width direction. In other words, the atmosphere-opening port 127 is covered with the under covers 99L, the rear side cover 98L, and the rear fender 48.

Figure 6:
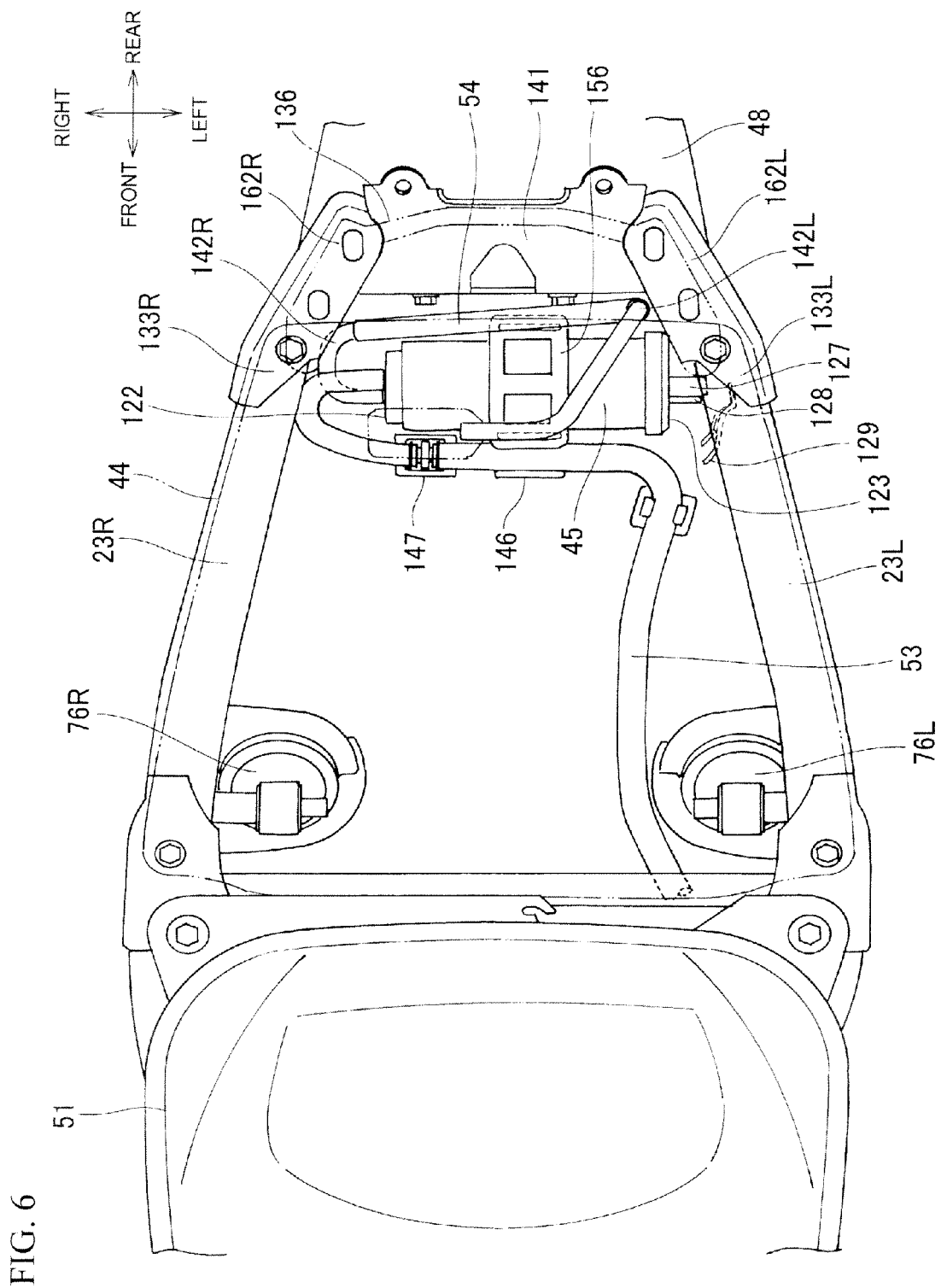
FIG. 6 is a cross-sectional view taken along a line 6-6 in FIG. 3.

As shown in FIG. 6, fuel tank mounting portions 133L, 133R which are provided at the pair of left and right seat rails 23L, 23R and to which the fuel tank 44 is mounted, are arranged outside the first side surface portion 122 and second side surface portion 123 in the vehicle width direction when viewed from a plan view of the vehicle.

The fuel tank mounting portions 133L, 133R are arranged outside the first side surface portion 122 and second side surface portion 123 in the vehicle width direction when viewed from the plan view of the vehicle, so that it is possible to enhance the effect of protecting the canister 45.

Referring to FIGS. 4 and 6, the canister 45 is arranged under the rear portion of the fuel tank 44, at least partially superposed on the fuel tank 44 as viewed from the plan view of the vehicle, and arranged in the vehicle forward direction relative to a cross member 136 which interconnects the rear portions of the pair of left and right seat rails 23L, 23R.

A seat catcher mechanism 141, which holds the seat 15, can be provided at the cross member 136. The seat catcher mechanism 141 extends in the height direction relative to the cross member 136. It is possible to cover the canister 45 from the vehicle rearward direction by the seat catcher mechanism 141 extending in the height direction, so that it is possible to increase a protection range for the canister 45 and to enhance dust resistance.

The intake piping 54 is extended in the vehicle width direction. Left and right ends 142L, 142R of the intake piping 54 in the vehicle width direction are bend-formed.

Fluid which enters the intake piping 54 when the vehicle is inclined to the left or right remains in the left end portion 142L or the right end portion 142R. Thereby, it is possible to suppress moving of the fluid in the intake piping 54 to the canister 45.

A guide piece 129 which guides the fluid discharged from the drain port 128 to an upper surface 48a of the rear fender is provided in the vicinity of an outlet of the drain port 128 and at an inner wall of the left under cover 99L.

A piping-holding portion 146 is arranged in the vehicle forward direction with respect to the canister 45 and provided between the canister and the fuel tank 44. The discharge piping 53 is allowed to pass between the canister 45 and the fuel tank 44.

The fuel tank 44 can be arranged apart from the canister in the vehicle forward direction relative to the canister 45, so that interference between the canister 45 and the fuel tank 44 is avoided, thus allowing the passage of the discharge piping 53. Therefore, a dead space is reduced and compactification of the vehicle is possible.

Figure 7:
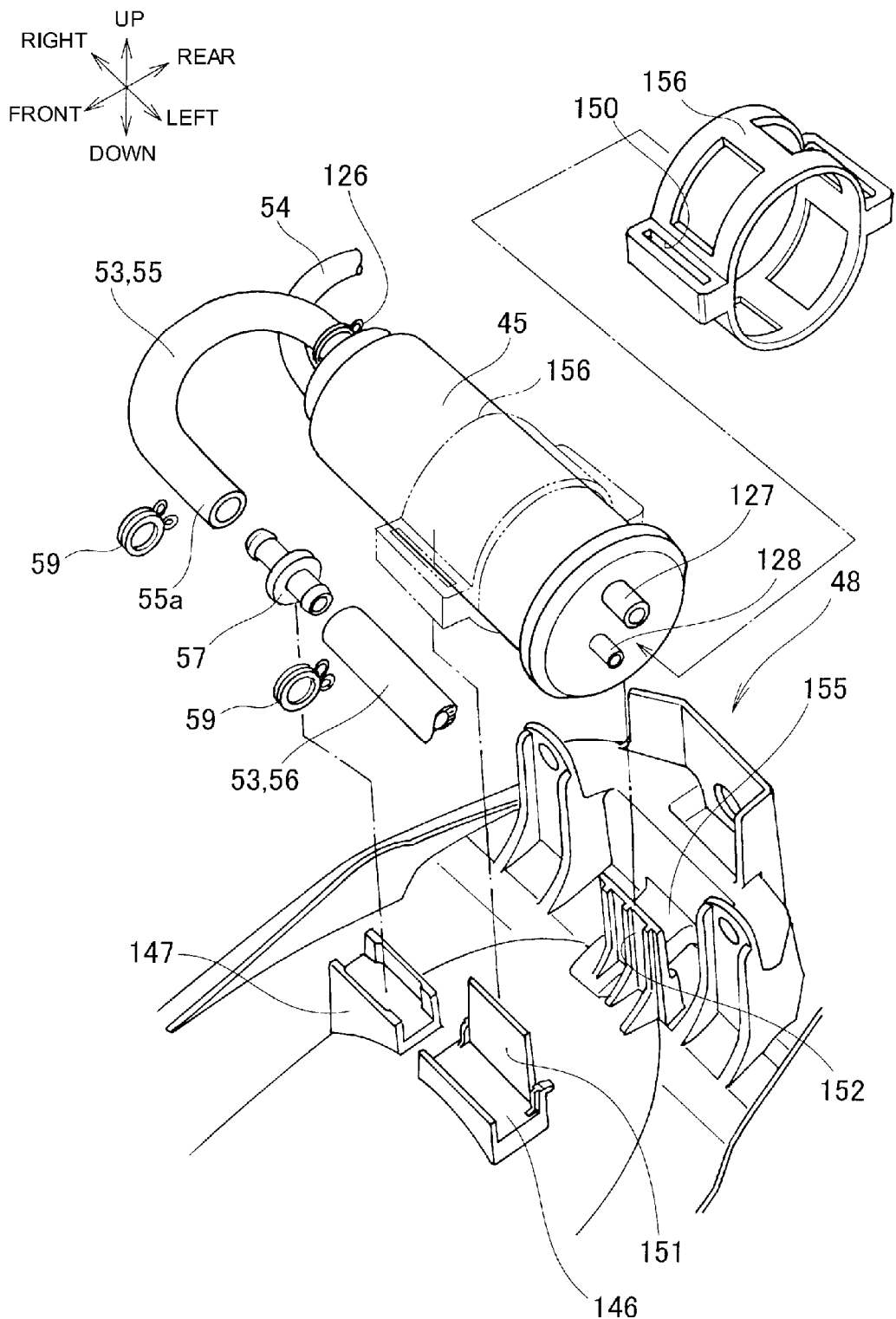
FIG. 7 is an exploded perspective view for explaining a mounting structure for the canister.

As shown in FIG. 7, a front rib 151 and a rear rib 152 which support the canister 45 can be formed integrally with the rear fender 48. Since the front rib 151 and the rear rib 152 which support the canister 45 are formed integrally with the rear fender 48, it is possible to reduce the number of components.

The discharge piping 53 which discharges the fuel gas accumulated in the canister 45 is extended from the fuel gas outlet port 126, and the discharge piping 53 is connected to the air intake system (in FIG. 2, reference sign 35) of the engine.

The discharge piping 53 is composed of first discharge piping 55 extending from the fuel gas outlet port 126, a joint member 57 connected to a tip 55a of the first discharge piping 55, and second discharge piping 56 extending from the joint member 57 and connected to the air intake system 35 of the engine. Reference sign 59 denotes hose clips or hose clamps. Since the discharge piping 53 is constructed as a division structure composed of the first discharge piping 55 and the second discharge piping 56, the discharge piping 53 can be easily formed as compared to single piping.

The piping-holding portion 146 which holds the second discharge piping 56 is formed integrally with the front rib 151 of the rear fender 48. Moreover, a piping holder portion 147 which holds the discharge piping 53 at a region of the joint member 57 is formed integrally with the rear fender 48. The discharge piping 53 is supported by the piping holder portion 147, whereby the discharge piping 53 is held.

Referring to the next drawing, a structure which holds the discharge piping 53 will be explained.

Figure 8:
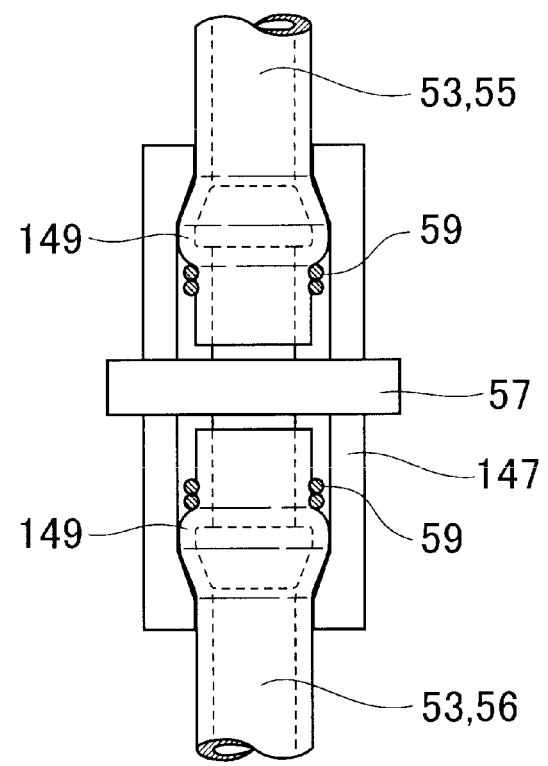
FIG. 8 is a view for explaining a holding structure for the discharge piping.

As shown in FIG. 8, the discharge piping 53 (the first discharge piping 55 and the second discharge piping 56) is fitted on outer peripheries of both ends of the joint member 57 and prevented from coming off from the joint member by the hose clips 59, 59. Outer diameters of portions 149, 149 of the pipings which are adjacent to fitted portions of the pipings are increased outward so as to become larger than those of other portions of the pipings, so that the portions 149, 149 adjacent to the fitted portions are adapted to be held and positioned by the piping holder portion 147.

When the discharge piping 53 is held at a position of the piping holder portion 147 to the piping holder portion 147, outer diameters of the first discharge piping 55 and second discharge piping 56 at connected portions are increased with the joint member 57, and the connected portions 158 which have increased outer diameters are held by the piping holder portion 147, thus making it possible to easily position the discharge piping 53 in a longitudinal axial direction of the piping.

Referring to FIGS. 6 and 8, the discharge piping 53 which discharges the fuel gas accumulated in the canister 45 is extended from the fuel gas outlet port 126, and the discharge piping 53 is connected to the air intake system 35 of the engine.

Moreover, a piping-bearing portion 155 which bears the intake piping (in FIG. 6, reference sign 54) in a vertical direction is formed at the rear rib 152. Concretely, the intake piping 54 is arranged so as to be located above an upper end of the rear rib 152. The piping-bearing portion 155 is provided at the rear rib 152, so that it is possible to realize weight reduction as compared to a case where a member holding the piping is provided separately from the rear fender 48, and possible to realize the holding of the intake piping 54.

Figure 9:
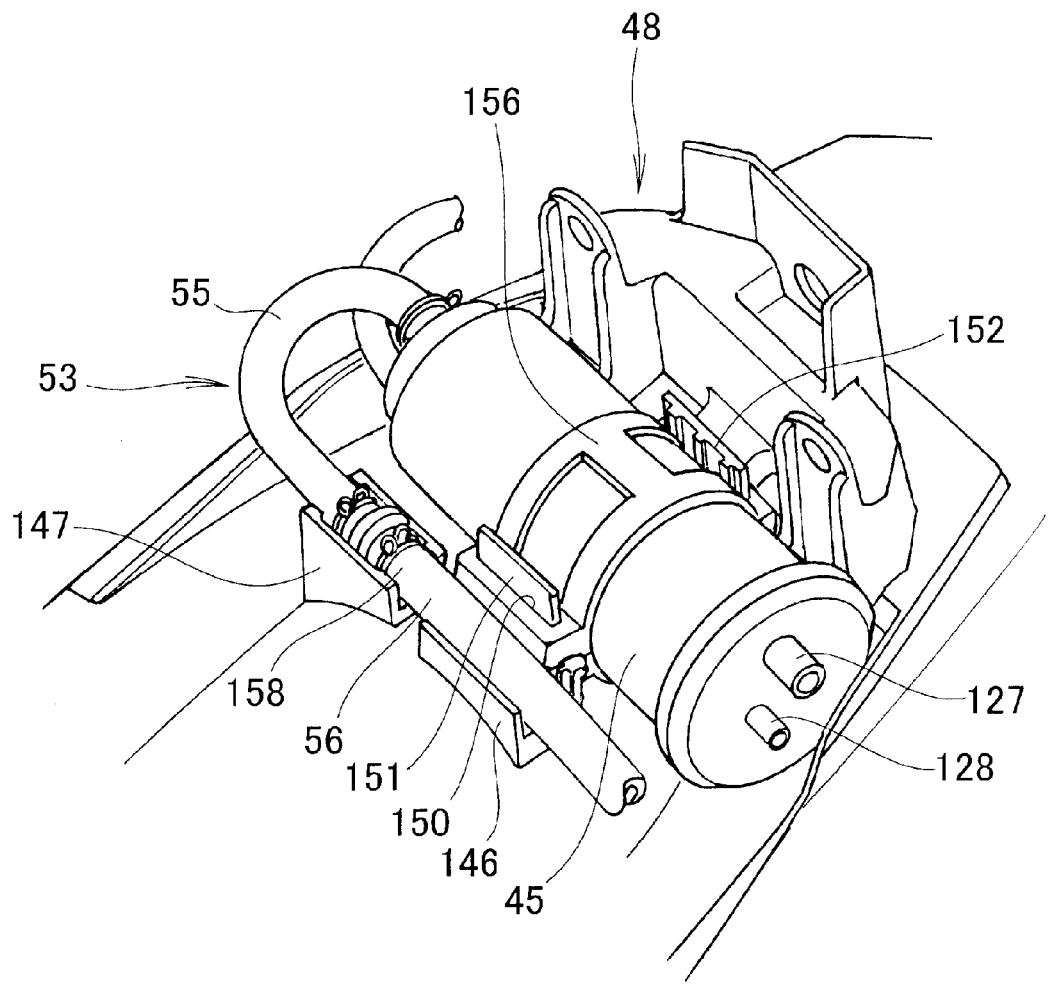
FIG. 9 is a perspective view illustrating an embodiment of FIG. 7 at the time of the completion of assembling.

As shown in FIG. 9, after a hold-down member 156 of a circular annular shape which is made of rubber or the like is fitted over the canister 45, the canister 45 is attached to the rear fender 48 by causing the ribs 151, 152 to be engaged in slit holes 150 which are provided at the hold-down member 156.

Referring to FIG. 6, grab rail mounting portions 162L, 162R which mount to the pair of left and right seat rails 23L, 23R a grab rail 161 which the occupant can grasp are provided at a position of the fuel tank mounting portions 133L, 133R in the vehicle rearward direction.

Figure 10:
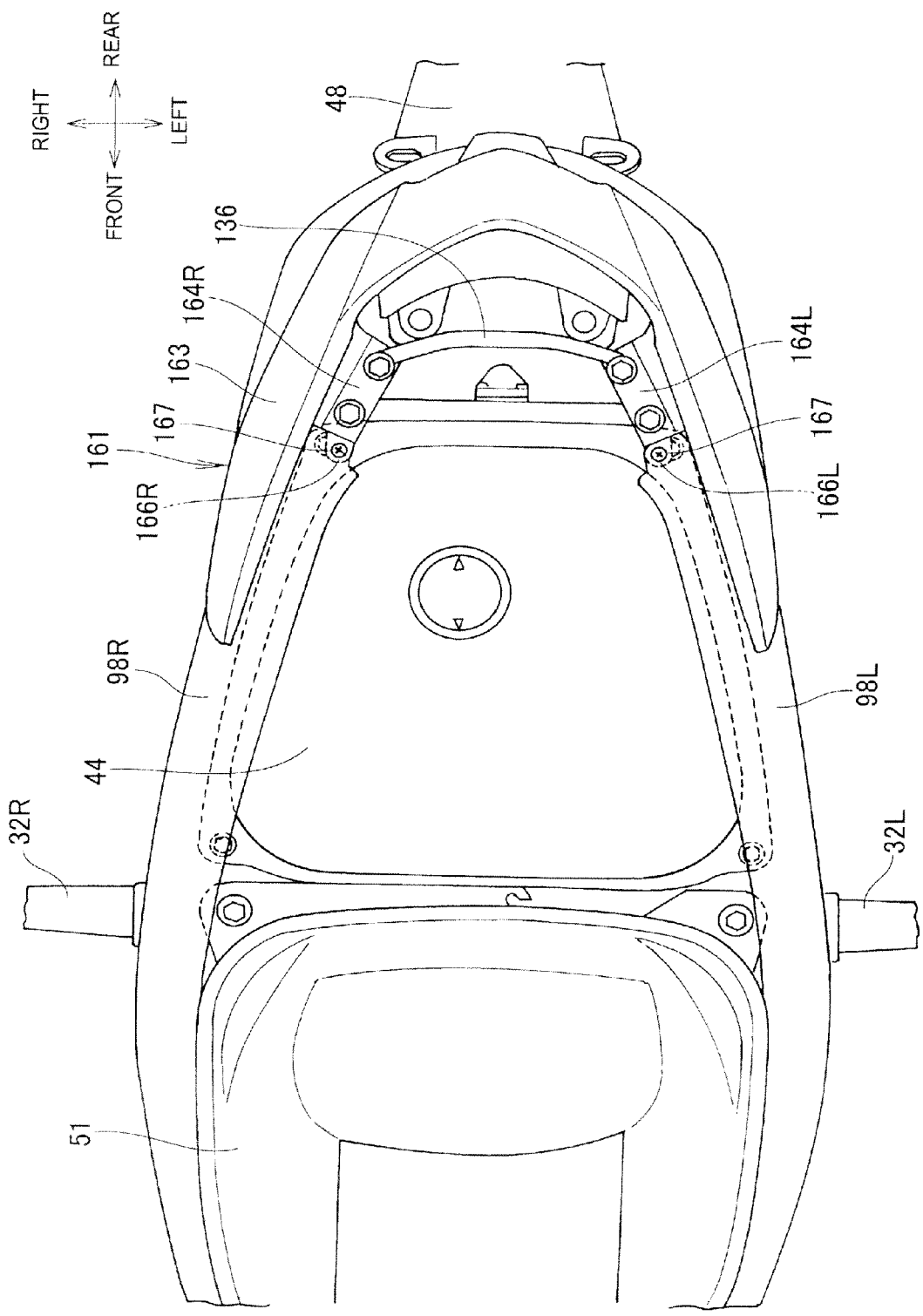
FIG. 10 is a view as viewed from an arrow 10 in FIG. 3.

As shown in FIG. 10, the grab rail 161 is mounted to the grab rail mounting portions (in FIG. 6, reference signs 162L, 162R).

The grab rail 161 exhibits a substantially U-shape when viewed from the plan view of the vehicle and has a grip portion 163 which the occupant can grasp, left and right seat portions 164L, 164R extending to the inside of the grip portion 163 in the vehicle width direction and provided so as to be capable of being abutted against the grab rail mounting portions 162L, 162R, the cross member 136 bridged between rear portions of the left and right seat portions 164L, 164R, and upper fixing portions 166L, 166R which extend in the vehicle forward direction from the left and right seat portions 164L, 164R and to which upper portions of the left and right rear side covers 98L, 98R are attached via fastening members 167, 167.

As shown in FIG. 6, the canister 45 is arranged under the rear portion of the fuel tank 44, in the vehicle forward direction with respect to the cross member 136, and between the pair of left and right seat rails 23L, 23R. In other words, the fuel tank 44 and the cross member 136 are arranged in front of the canister 45 and in rear of the canister 45, respectively, and the seat rails 23L, 23R are arranged laterally in the left and right direction with respect to the canister 45.

The left, right and rear sides of the canister 45 are surrounded by the seat rails 23L, 23R and the cross member 136, so that it is possible to protect the canister 45 without involving an increase in the number of components.

Moreover, the canister 45 is formed so as to be at least partially superposed on the fuel tank 44 when viewed from the plan view of the vehicle, so that a predetermined fuel tank volume can be easily secured and a space in rear of the fuel tank can be effectively used.

Referring to FIG. 6 together with FIG. 4, the canister 45 extends in the vehicle width direction, so that an increase in size in the vehicle longitudinal direction is suppressed, an increased length of the fuel tank 44 in the vehicle width direction is obtained, and a fuel volume is easily secured.

The atmosphere-opening port 127 which is opened in the canister 45 is covered by the under covers 99L, 99R acting as the connecting members, thus making it possible to enhance dust resistance in the vicinity of the atmosphere-opening port 127. When the dust resistance in the vicinity of the atmosphere-opening port 127 is enhanced, any piping which is usually connected the atmosphere-opening port 127 can be omitted. If the piping can be omitted, the overall size and weight of the vehicle can be reduced.

As shown in FIG. 2, the discharge piping 53 can be held by the resin luggage box 51 which is relatively large-sized. If the resin-made luggage box 51 is employed, the holding portions, hose hooks 52, for example, for the discharge piping can be easily formed and the hose hooks 52 can be arranged relatively freely at the side portion of the relatively large-sized luggage box 51. Therefore, the routing of the discharge piping 53 can be made linear and a piping length can be reduced.

Figure 11:
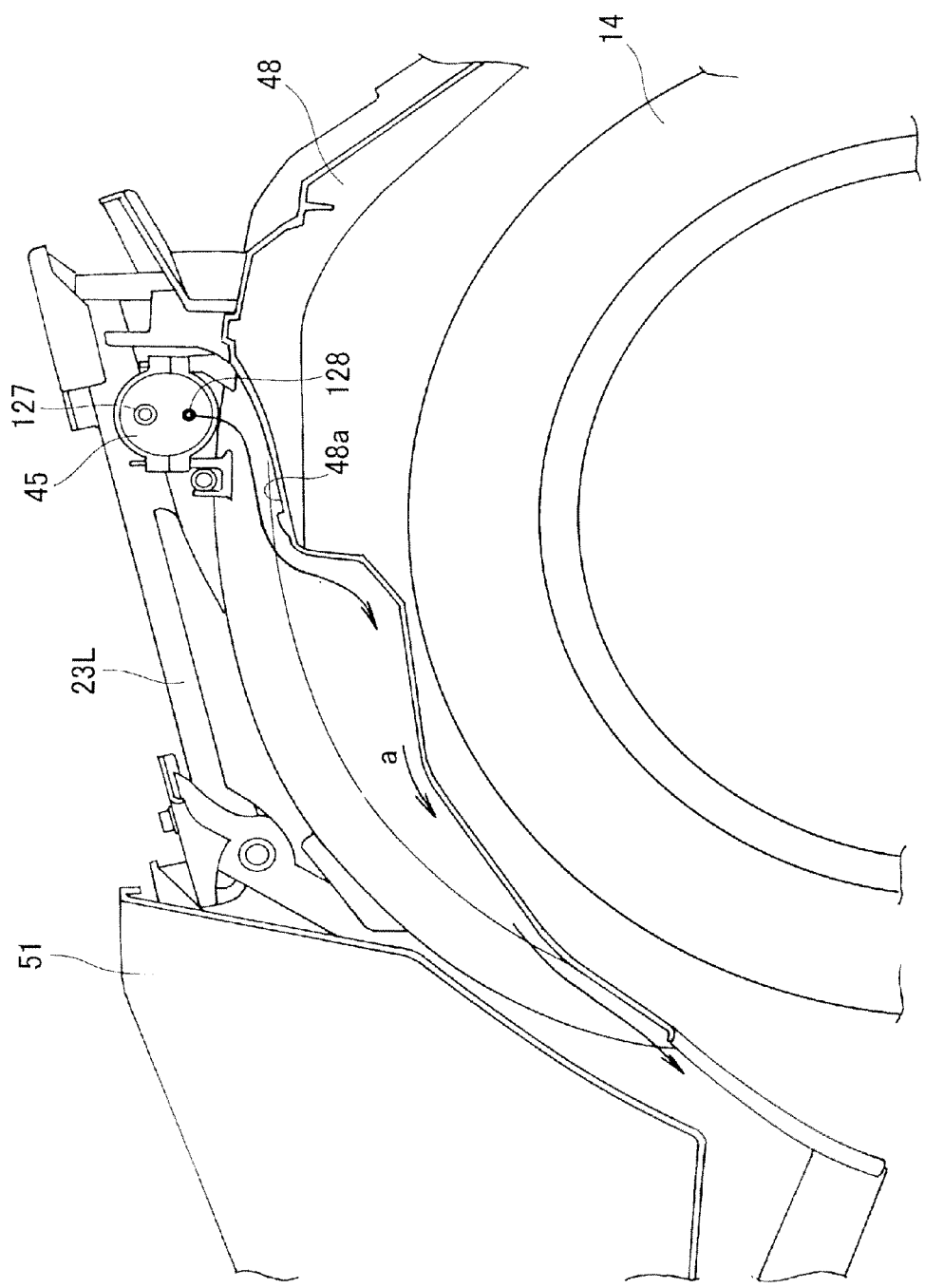
FIG. 11 is a view for explaining a flow of liquid discharged from a drain port.

As shown in FIG. 11, the fuel which is discharged from the drain port 128 reaches the upper surface 48a of the rear fender along the guide piece 129 provided at the inner wall of the left under cover 99L in the vicinity of the outlet of the drain port 128. The fuel is guided in the vehicle forward direction as indicated by an arrow a in drawing, and discharged out of the vehicle. Thanks to the provision of the guide piece 129, even if a vehicle posture is changed, the fluid can be guided in a suitable direction.

Incidentally, while the present invention is applied to the motorcycle in the embodiment, it is also applicable to a saddle-ride type three-wheeled vehicle and may be applied to a general saddle-ride type vehicle.

REFERENCE SIGNS LIST

10 . . . Saddle-ride type vehicle (Motorcycle)
14 . . . Rear wheel
15 . . . Seat
20 . . . Vehicle body frame
23L, 23R . . . Seat Rail
35 . . . Air intake system of engine
44 . . . Fuel tank
45 . . . Canister 48 . . . Fender (Rear fender)
51 . . . Luggage box
52 . . . Hose hook
53 . . . Discharge piping
54 . . . Piping (Intake piping)
55 . . . First discharge piping
56 . . . Second discharge piping
57 . . . Joint member
90 . . . Vehicle body cover
98L, 98R . . . Vehicle body cover (Rear side cover)
99L, 99R . . . Vehicle body cover (Under cover)
100 . . . Connecting member
121 . . . Body portion
122 . . . First side surface portion
123 . . . Second side surface portion
125 . . . Fuel gas inlet port
126 . . . Fuel gas outlet port
127 . . . Atmosphere-opening port
128 . . . Drain port
133L, 133R . . . Fuel tank mounting portion
136 . . . Cross member
141 . . . Seat catcher mechanism
142L, 142R . . . Left and right ends of intake piping
146 . . . Piping-holding portion
147 . . . Piping holder portion
151 . . . Rib (Front rib)
152 . . . Rear rib
155 . . . Piping-bearing portion
161 . . . Grab rail

The invention claimed is:

1. A saddle-ride type vehicle, comprising:
a vehicle body frame including left and right seat rails, said left and right seat rails extending in a vehicle rearward direction;
a fuel tank mounted to the left and right seat rails;
a seat disposed above the fuel tank;
a fender disposed below the fuel tank and covering at least an upper portion of a rear wheel; and
a canister disposed above the fender,
wherein the canister is disposed under a rear portion of the fuel tank, so as to be at least partially superposed on the fuel tank as viewed from a plan view of the vehicle and so as to be superposed on the seat rails as viewed from a side of the vehicle, and is disposed in a vehicle forward direction with respect to a cross member which interconnects rear portions of the left and right seat rails.

2. The saddle-ride type vehicle according to claim 1,
wherein end portions of the fender in a vehicle width direction are connected to a vehicle body cover which is disposed, via a connecting member, outward of the canister in the vehicle width direction,
wherein the canister includes a body portion extending in the vehicle width direction, a first side surface portion forming one side surface in a left and right direction which closes an opening of the body portion, and a second side surface portion forming another side surface in the left and right direction, and wherein a fuel gas inlet port configured to enable fuel gas evaporating in the fuel tank to flow into the canister, and a fuel gas outlet port which allows the fuel gas accumulated in the canister to be discharged outside the canister, are disposed at the first side surface portion, and an atmosphere-opening port configured to enable pressure in the canister to be regulated to an atmospheric pressure, and a drain port configured to enable liquid accumulated in the canister to be discharged are disposed at the second side surface portion;
said vehicle further comprising intake piping connected to the fuel tank and configured to enable the fuel gas evaporating in the fuel tank to flow, said intake piping also connected to the fuel gas inlet port; and wherein
the atmosphere-opening port is opened so as to face the vehicle body cover.

3. The saddle-ride type vehicle according to claim 2, further comprising fuel tank mounting portions provided at the left and right seat rails wherein the fuel tank is mounted thereupon, said fuel tank mounting portions being disposed outside the first side surface portion and the second side surface portion in the vehicle width direction when viewed from the plan view of the vehicle.

4. The saddle-ride type vehicle according to claim 3, further comprising grab rail mounting portions which mount a grab rail to each of the left and right seat rails, said grab rails being configured such that an occupant can grasp thereupon, said grab rail mounting portions being provided at a position of the fuel tank mounting portions in the vehicle rearward direction.

5. The saddle-ride type vehicle according to claim 2, further comprising:
discharge piping configured to discharge the fuel gas accumulated in the canister, said discharge piping being connected to the fuel gas outlet port and to an air intake system of an engine,
wherein the discharge piping comprises a first discharge pipe extending from the fuel gas outlet port, a joint member connected to a tip of the first discharge pipe, and a second discharge pipe extending from the joint member and connected to the air intake system of the engine, and wherein
a piping holder portion which holds the discharge piping at a region of the joint member is formed integrally with the fender.

6. The saddle-ride type vehicle according to claim 5,
further comprising a resin luggage box disposed in a vehicle forward direction relative to the fuel tank and under the seat; and
a hose hook configured to lock the discharge piping, said hose hook being disposed at the luggage box,
wherein the air intake system is disposed in front of the luggage box.

7. The saddle-ride type vehicle according to claim 2, wherein the intake piping is extended in the vehicle width direction and bend-formed so as to be folded back in a left direction and a right direction.

8. The saddle-ride type vehicle according to claim 2, further comprising a rib which supports the canister, said rib being disposed integrally with the fender, and a piping holding portion, which bears a discharge piping, being formed at the rib.

9. The saddle-ride type vehicle according to claim 2, further comprising a rib which supports the canister, said rib being disposed integrally with the fender, and a piping bearing portion, which bears the intake piping, being formed at the rib.

10. The saddle-ride type vehicle according to claim 1, further comprising a seat catcher mechanism configured to hold the seat, said seat catcher mechanism being disposed at the cross member.

11. A saddle-ride type vehicle, comprising:
vehicle body frame means including left and right seat rail means, said vehicle body frame means for supporting vehicle components thereupon;
fuel tank means for storing fuel therein, said fuel tank means disposed upon the left and right seat rail means;

seat means for supporting a rider, said seat means disposed above the fuel tank means;

fender means for covering at least a portion of a rear wheel, said fender means disposed below the fuel tank means;

canister means for receiving fuel vapors therein, said canister means being disposed above the fender means, wherein the canister means is disposed under a rear portion of the fuel tank means so as to be at least partially superposed on the fuel tank means as viewed from a plan view of the vehicle, and so as to be superposed on the seat rail means as viewed from a side of the vehicle, said canister means also being disposed in a vehicle forward direction with respect to a cross member for interconnecting rear portions of the left and right seat rail means.

12. The saddle-ride type vehicle according to claim 11, further comprising:

vehicle body cover means for covering a portion of a vehicle body, said vehicle body cover means being connected to end portions of the fender means in a vehicle width direction via a connecting member, outward of the canister means in the vehicle width direction, wherein the canister means includes a body portion extending in the vehicle width direction, a first side surface portion forming one side surface in a left and right direction which closes an opening of the body portion, and a second side surface portion forming another side surface in the left and right direction, and wherein fuel gas inlet port means for allowing fuel gas evaporating in the fuel tank means to flow into the canister means, and fuel gas outlet port means for allowing the fuel gas accumulated in the canister means to be discharged, are disposed at the first side surface portion, and atmosphere-opening port means for causing pressure in the canister means to be regulated to an atmospheric pressure, and drain port means for allowing liquid accumulated in the canister means to be discharged are disposed at the second side surface portion;

said vehicle further comprising intake piping means for enabling the fuel gas evaporating in the fuel tank means to flow from the fuel tank means, said intake piping means being connected to the fuel gas inlet port means, wherein the atmosphere-opening port means is opened so as to face the vehicle body cover means.

13. The saddle-ride type vehicle according to claim 12, further comprising fuel tank mounting means disposed at the left and right seat rail means, wherein the fuel tank means is mounted upon the fuel tank mounting means, said fuel tank mounting means being disposed outside the first side surface portion and second side surface portion in the vehicle width direction when viewed from the plan view of the vehicle.

14. The saddle-ride type vehicle according to claim 13, further comprising grab rail mounting means for mounting a grab rail to the left and right seat rail means, said grab rail being configured such that an occupant can grasp thereupon, said grab rail mounting means being provided at a position of the fuel tank mounting means in the vehicle rearward direction.

15. The saddle-ride type vehicle according to claim 12, further comprising:

discharge piping means for discharging the fuel gas accumulated in the canister means, said discharge piping means being connected to the fuel gas outlet port means, and to an air intake system of an engine, wherein the discharge piping means comprises a first discharge pipe extending from the fuel gas outlet port means, a joint member connected to a tip of the first discharge pipe, and a second discharge pipe extending from the joint member and connected to the air intake system of the engine, and wherein piping holder means for holding the discharge piping means at a region of the joint member is disposed integrally with the fender means.

16. The saddle-ride type vehicle according to claim 15, further comprising:

luggage storage means for storing luggage therein disposed in a vehicle forward direction relative to the fuel tank means and under the seat means;

locking means for locking the discharge piping means, said locking means being disposed at the luggage storage means, wherein the air intake system is disposed in front of the luggage storage means.

17. The saddle-ride type vehicle according to claim 12, wherein the intake piping means extends in the vehicle width direction, and includes a bent portion so as to be folded back in a left direction and right direction.

18. The saddle-ride type vehicle according to claim 12, further comprising rib means for supporting the canister means, said rib means being disposed integrally with the fender means, and a piping means holding portion, which bears discharge piping means, being disposed at the rib means.

19. The saddle-ride type vehicle according to claim 12, further comprising rib means for supporting the canister means, said rib means being disposed integrally with the fender means, and a piping means bearing portion, which bears the intake piping means, being disposed at the rib means.

20. The saddle-ride type vehicle according to claim 11, further comprising seat catcher means for holding the seat means, said seat catcher means being provided at the cross member.

* * * * *